(12) United States Patent
Hart et al.

(10) Patent No.: US 8,355,370 B2
(45) Date of Patent: Jan. 15, 2013

(54) WIRELESS COMMUNICATION SYSTEMS (75) Inventors: Michael John Beems Hart, London (GB); Yuefeng Zhou, Surrey (GB); Kevin Power, West Drayton (GB)

(73) Assignee: Fujitsu Limited, Kawasaki (JP)

( * ) Notice: Subject to any disclaimer, the term of this patent is extended or adjusted under 35 U.S.C. 154(b) by 995 days.

(21) Appl. No.: 12/125,253

(22) Filed: May 22, 2008

(65) Prior Publication Data

US 2009/0061887 A1    Mar. 5, 2009

(30) Foreign Application Priority Data

Aug. 31, 2007  (GB) .................................. 0716966.7

(51) Int. Cl.
    H04J 3/16         (2006.01)
(52) U.S. Cl. ........................................ 370/329; 370/252
(58) Field of Classification Search .................. 370/329, 370/252
    See application file for complete search history.

(56) References Cited

U.S. PATENT DOCUMENTS

| | | | |
|---|---|---|---|
| 6,330,700 B1 * | 12/2001 | Morris et al. ................. | 714/752 |
| 6,526,036 B1 * | 2/2003 | Uchida et al. ................. | 370/342 |
| 6,557,142 B2 * | 4/2003 | Morris et al. ................. | 714/815 |
| 6,590,878 B1 * | 7/2003 | Uchida et al. ................. | 370/330 |
| 7,551,932 B2 * | 6/2009 | Hans et al. ..................... | 455/465 |
| 7,640,373 B2 * | 12/2009 | Cudak et al. .................... | 710/19 |
| 7,715,318 B2 * | 5/2010 | Haghighat et al. ............. | 370/235 |
| 7,904,098 B2 * | 3/2011 | Hans et al. ................. | 455/456.1 |
| 2002/0046381 A1 * | 4/2002 | Morris et al. ................. | 714/752 |
| 2003/0073409 A1 | 4/2003 | Nobukiyo et al. | |
| 2003/0100269 A1 * | 5/2003 | Lehtinen et al. ................ | 455/69 |
| 2005/0054362 A1 | 3/2005 | Panpaliya et al. | |
| 2005/0105488 A1 * | 5/2005 | Raji et al. ..................... | 370/331 |

(Continued)

FOREIGN PATENT DOCUMENTS

GB            2405289            2/2005

(Continued)

OTHER PUBLICATIONS

Search Report under Section 17 dated Oct. 22, 2007, for corresponding British Application GB0716966.7.

(Continued)

*Primary Examiner* — Jay P Patel
(74) *Attorney, Agent, or Firm* — Katten Muchin Rosenman LLP (57) ABSTRACT

A wireless communication method used in a system comprising a base station and a plurality of fixed or mobile subscriber stations, the base station maintaining connections with each of the subscriber stations by performing wireless communication in units of frames, and within each frame, allocating resources for data transmissions and signalling in the wireless communication system. The method involves providing, in each frame, a new dedicated shared channel for use by the subscriber stations to report a connection quality to the base station. To save bandwidth in the system, the resources allocated to the shared channel are less than the total resources needed for every subscriber station to report individually within the same frame. The method includes, in the base station, allocating resources to the shared channel, dividing the shared channel into a plurality of reporting opportunities, and transmitting requests for reports to the subscriber stations; and in the subscriber stations, responding to said requests by randomly selecting one of said reporting opportunities and sending a report on the channel quality. Preferably, the responding step is conditional upon the channel quality experienced by each subscriber station meeting a threshold condition set by the base station and included in the requests.

14 Claims, 7 Drawing Sheets

U.S. PATENT DOCUMENTS

| | | | |
|---|---|---|---|
| 2005/0157678 A1* | 7/2005 | Mantha et al. | 370/329 |
| 2005/0233754 A1 | 10/2005 | Beale | |
| 2005/0246417 A1* | 11/2005 | Raith et al. | 709/203 |
| 2006/0148428 A1* | 7/2006 | Porter et al. | 455/114.3 |
| 2007/0049206 A1 | 3/2007 | Jabbary | |
| 2007/0049207 A1* | 3/2007 | Haghighat et al. | 455/69 |
| 2007/0082619 A1 | 4/2007 | Zhang et al. | |
| 2007/0168326 A1* | 7/2007 | Das et al. | 707/2 |
| 2007/0268846 A1* | 11/2007 | Proctor et al. | 370/279 |

FOREIGN PATENT DOCUMENTS

| | | |
|---|---|---|
| JP | 2003-199173 | 7/2003 |
| WO | 02093951 | 11/2002 |
| WO | 2004042963 | 5/2004 |
| WO | 2004054134 | 6/2004 |
| WO | 2007/055544 | 5/2007 |

OTHER PUBLICATIONS

Part 16: Air Interface for Fixed Broadband Wireless Access Systems, 2004, IEEE Standards for Local and Metropolitan Area Networks.

Part 16: Air Interface for Fixed and Mobile Broadband Wireless Access Systems: Amendment 2: Physical and Medium Access Control Layers for Combined Fixed and Mobile Operation in Licensed Bands, 2006, IEEE Standards for Local and Metropolitan Area Networks.

European Search Report dated Jun. 14, 2012, from corresponding European Application No. 08 15 4510.

Notification of Reasons for Refusal dated Jul. 24, 2012, from corresponding Japanese Application No. 2008-220849.

* cited by examiner

WIRELESS COMMUNICATION SYSTEMS

FIELD OF THE INVENTION

The present invention relates to wireless communication systems of the type in which a base station (BS) communicates with multiple fixed or mobile subscriber stations (MS).

BACKGROUND OF THE INVENTION

Recently, various standards have been developed for data communication over broadband wireless links. One such standard is set out in the IEEE 802.16 specifications and is commonly known as WiMAX. The specifications include IEEE 802.16-2004, primarily intended for systems having fixed subscriber stations, and IEEE 802.16e-2005 which among other things provides for mobile subscriber stations. In the following description, the term mobile station (MS) is used as shorthand for both mobile and fixed subscriber stations. The term "user" is also used equivalently to mobile station.

The entire contents of IEEE Std 802.16-2004 "Air Interface for Fixed Broadband Wireless Access Systems" and IEEE Std 802.16e-2005 "Amendment 2 and Corrigendum 1 to IEE Std 802.16-2004" are hereby incorporated by reference. IEEE 802.16 defines wireless communication systems in which the mobile stations communicate with a base station within range, the range of a base station defining at least one "cell". By deploying base stations at suitable positions within a given geographical area, and/or by providing multiple antennas in the same base station, a contiguous group of cells can be created to form a wide-area network. In this specification, the terms "network" and "system" will be used equivalently.

In systems of the above type, data is communicated by exchange of packets between the mobile stations and base station whilst a connection (management connection or transport connection) is maintained between them. Below, the term "channel" is sometimes used to refer to such a connection between one MS and its BS, as should be clear from the context. The direction of transmission of packets from the subscriber station to the base station is the uplink (UL), and the direction from the base station to the subscriber station is the downlink (DL). The packets have a defined format which follows a layered protocol applied to the system and its component radio devices. Protocol layers relevant to packets as such are the so-called physical layer (PHY) and media access layer (MAC). In the IEEE 802.16-2004 specification, these protocol layers form a protocol "stack" as shown in FIG. 1.

Figure 1:
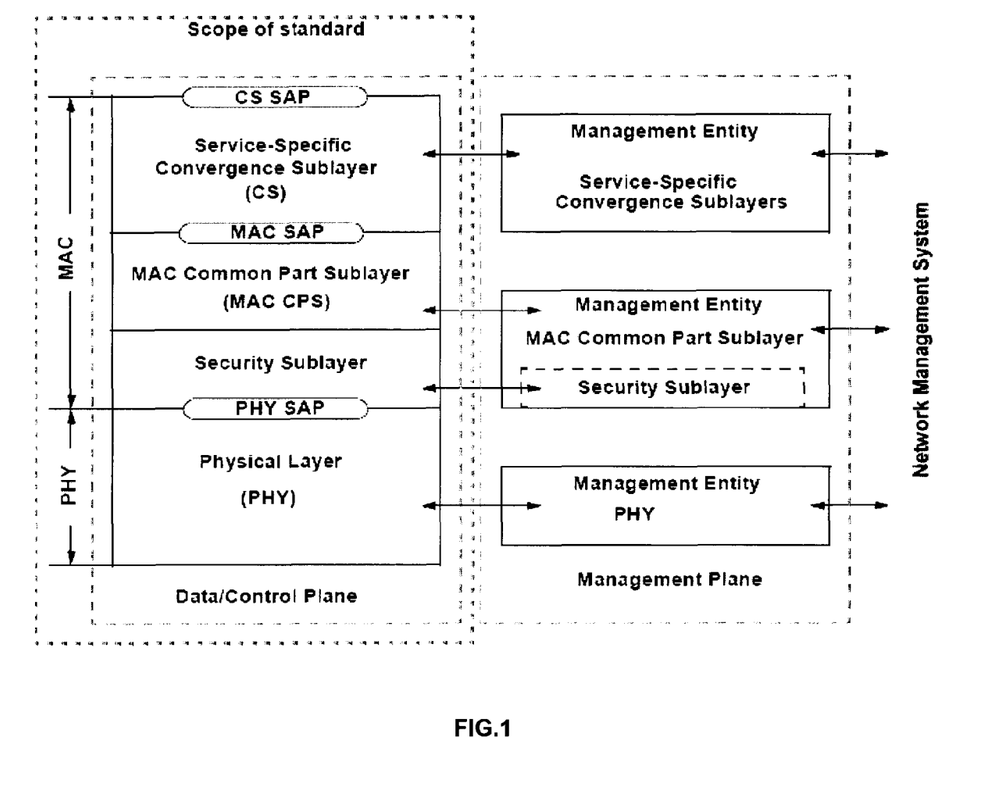
FIG. 1 shows protocol layering in accordance with an IEEE 802.16 wireless communication system.

The media access layer shown in FIG. 1 is the protocol layer of most concern in the invention to be described. It is responsible for handling various functions including network access, bandwidth allocation, and maintaining connections. This includes controlling access of the BS and SS's to the network on the basis of "frames" which are the predetermined unit of time in the system, and which are divided in the time and frequency domain into a number of slots, and when utilising multiple transmit antennas may also be divided spatially into a number of streams.

Various physical layer implementations are possible in an IEEE 802.16 network, depending on the available frequency range and application; for example, a time division duplex (TDD) mode and a frequency division duplex (FDD) mode as described below. The PHY layer also defines the transmission technique such as OFDM (orthogonal frequency division multiplexing) or OFDMA (orthogonal frequency division multiple access), which techniques will now be outlined briefly.

In OFDM, a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each sub-carrier is less than the coherence bandwidth of the channel. As a result, the channel distortion experienced on a signal sub-carrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of the sub-carriers to an individual subscriber. This allows simultaneous transmission from several users leading to better spectral efficiency. However, there is still the issue of allowing bidirectional communication, that is, in the uplink and download directions, without interference.

In order to enable bidirectional communication between two nodes, two well known different approaches exist for duplexing the two (forward or downlink and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for DL and the other for UL communications. The second, time division duplexing (TDD), involves operating the two links on the same frequency band, but subdividing the access to the medium in time so that only the DL or the UL will be utilizing the medium at any one point in time. Although both approaches have their merits and the IEEE802.16 standard incorporates both an FDD and TDD mode, the remainder of this description will mainly refer to the TDD mode.

Figure 2:
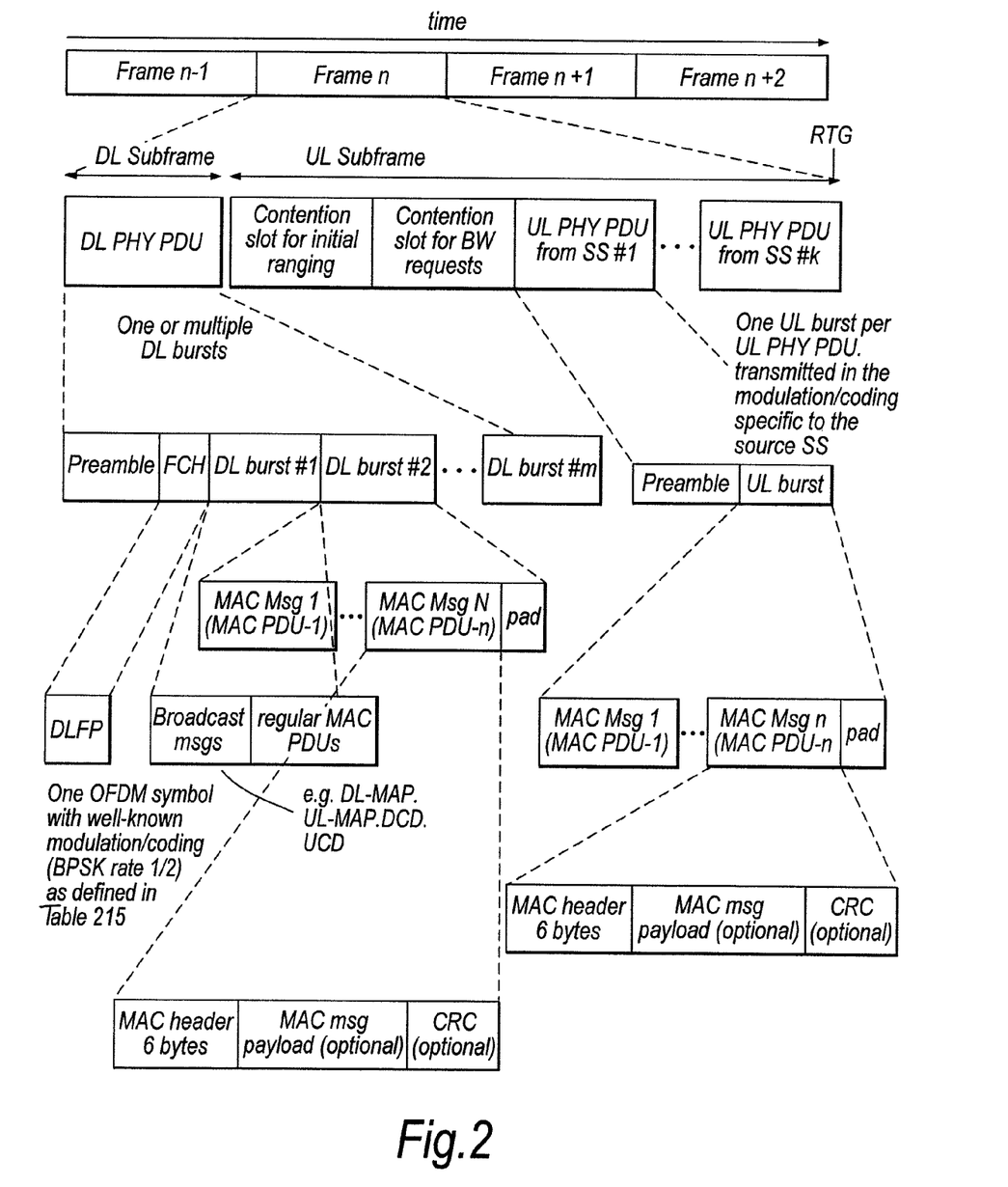
FIGS. 2 and 3 are for explaining a TDD mode frame format used in an IEEE 802.16 wireless communication system, FIG. 2 showing the frame structure at the packet level and FIG. 3 showing the structure at the burst level.
Figure 3:
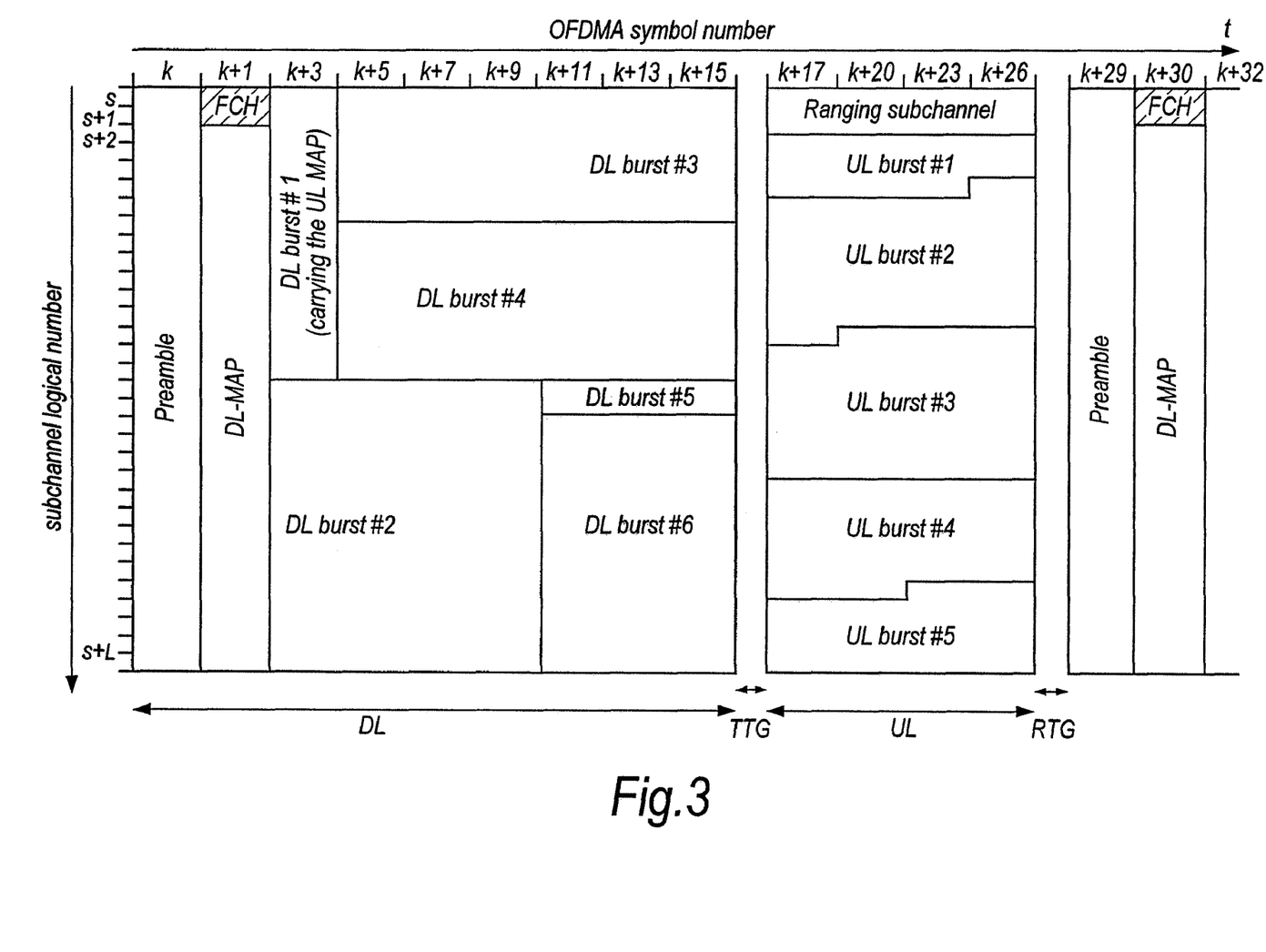

FIGS. 2 and 3 illustrate the TDD frame structure used in the OFDM/OFDMA physical layer mode of the IEEE802.16 standard (WiMAX).

Referring first to FIG. 2, this shows an OFDM TDD frame structure from a packet perspective. The UL subframe shown in FIG. 2 first provides a contention slot for initial ranging. Initial ranging is the process by which an MS is admitted to the network, and involves the MS using the slot, on a contended basis (that is, in competition with any similar ranging requests from other users) to send an ID code to the BS, commonly referred to as a CDMA based ranging request. The BS responds to receipt of a ranging code by making a resource allocation on the next UL subframe. Although the BS does not yet know which MS made the CDMA based ranging request, the intended recipient is able to use the allocated resource to reply with a message (typically RNG-REQ, a MAC management message as referred to below) to identify itself and start off the network entry procedure.

The next resource allocated within the UL subframe is a contention slot for BW requests, which is used by any of the subscriber stations (again on a contended basis) to request bandwidth from the base station. A similar procedure may be followed as just outlined for initial ranging.

FIG. 2 further illustrates, within the UL-subframe, a packet format having two parts, a PHY header and a MAC PDU. The MAC PDU in turn consists of a MAC header, an optional payload, and optional error check code (cyclic redundancy code or CRC). The PHY header includes training sequences. Within the MAC PDU, the MAC header normally gives essential parameters for media access, such as the type of header, CID, and format of the PDU (e.g. whether it is encrypted, length) etc. The CRC within MAC PDU is optional, and can be used to check the received MAC PDU. The payload within MAC PDU is used to contain the data which the MS wishes to send to the BS, but is also optional. For example, some controlling messages, such as a bandwidth request, or an ACK message, have no payload, such as a Feedback header referred to later.

In general, the payload of the DL or UL MAC PDU can include any of a set of predefined MAC messages (Mmsg). These include a Channel measurement Report Request (REP-REQ) and a Channel measurement Report Response (REP-RSP) which are referred to later. Furthermore, a subheader may be included immediately after the generic MAC header of a MAC PDU. One purpose of this subheader is to define a fast feedback channel, which is also referred to later.

The same basic structure is also employed in OFDMA, although there are some differences in the PHY layer signalling. The OFDMA physical layer divides the available OFDM symbols and component sub-carriers (see FIG. 3) into distinct logical and physical subchannels, allowing multiple bursts to co-exist or overlap in each time interval. On the downlink, a single burst may be shared by several users (subscriber stations) but on the uplink, each burst generally corresponds to a single user.

In FIG. 3, the frame can be considered to occupy a given length of time and a given frequency band, the time dimension being denoted in FIG. 3 by "OFDMA symbol number", and the frequency dimension by "subchannel logical number" (each subchannel is a set of the sub-carriers referred to above). Each frame is divided into DL and UL subframes, each being a discrete transmission interval. They are separated by a Transmit/Receive and Receive/Transmit Transition Guard interval (TTG and RTG respectively). Each DL subframe starts with a preamble followed by the Frame Control Header (FCH), the DL-MAP, and, if present, the UL-MAP. The FCH contains the DL Frame Prefix (DLFP—see also FIG. 2) to specify the burst profile and the length of the DL-MAP. The DLFP is a data structure transmitted at the beginning of each frame and contains information regarding the current frame; it is mapped to the FCH. Simultaneous DL allocations can be broadcast, multicast and unicast and they can also include an allocation for another BS rather than a serving BS. Simultaneous ULs can be data allocations and ranging or bandwidth requests.

The DL-subframe includes a broadcast control field with a DL-MAP and UL-MAP, by which the BS informs the receiving device of the frame structure. The MAP is a map of bandwidth allocation in the frame and also contains other PHY signalling related messages. It consists of Information Elements (IE) each containing a connection ID. The map IEs inform mobile stations to which burst(s) they have been assigned to receive information. Thus, in a TDD and FDD mode network, bandwidth allocation means the allocation of resources (slots) within frames. The DL-MAP and UL-MAP are examples of management messages broadcast by the BS (that is, transmitted to all subscribers). The areas marked UL burst#1 to #5 in FIG. 3 represent allocations to respective users for their data transmissions to the BS. In this example, each burst extends over the whole of the time dimension (the duration of the UL subframe) but occupies a different part of the available frequency dimension (subcarriers).

The UL-subframe further includes so-called channel quality indication channels (CQICH) which are used by the MSs to feed back channel quality to the BS as mentioned below.

A connection between a base station and subscriber station (more precisely, between MAC layers in those devices—so-called peer entities) is assigned a connection ID (CID) and the base station keeps track of CIDs for managing its active connections or service flows. A service flow could represent, for example, a voice call conducted by the user of the MS.

In wireless communication systems, and in particular OFDM and OFDMA systems employing adaptive channel encoding and modulation, it is very important for each MS to inform its BS of the quality of its connection (also called channel quality) and of other parameters. One way of achieving this, known in the art, is for each MS to send sporadic messages to the BS. The way generally used to do this is by sending a MAC management message (Mmsg) to report to the BS, such as the REP-RSP mentioned above. Such a Mmsg may be solicited, that is requested by the BS by sending a REP-REQ, or may be unsolicited. An alternative method of sending such a message is to use a special MAC header without a PDU payload, for example, a feedback header sent by an MS either as a response to a Feedback Polling IE or as an unsolicited feedback.

A second way for the MS to inform the BS of the connection quality is to use a fast feedback (FFB) dedicated channel such as the CQICH mentioned earlier, on which each MS periodically reports to the BS. Here, "dedicated" means that a slot (or part of a slot) is allocated to just one connection without being shared by other users in any one frame; however, the same physical resource may be used for a different connection (user) in a subsequent frame. Allocation of bandwidth to a FFB channel takes place either through the FFB MAC subheader mentioned above, or through a CQICH Control IE and CQICH Allocation IE. These allocations can be made on a one-off basis (FFB MAC subheader), or in other words, lasting for only the current frame, or persistent basis (CQICH Allocation IE) and the persistent allocations may occur periodically, i.e. every frame or every n frames. Various ways are available to make this allocation as is known to those skilled in the art.

It is also possible to combine these two approaches so that each MS may send sporadic Mmsgs in addition to using the dedicated feedback channel for reporting during the same session.

However, there are problems with the above approaches as follows. Using Mmsg on a regular basis incurs a high processing overhead, especially when the BS is serving many mobile stations. When using a FFB channel, whilst the overhead is potentially lower, the BS has to allocate a dedicated resource to each MS even if the MS has nothing of significance to report (i.e. no change in conditions). In some applications, a number of MSs may need to report to the BS non-periodically but frequently, in which case neither the Mmsg nor the dedicated channel approach will provide an optimum mechanism. In such a case, the BS will not know when and how many of the mobile stations will report at any one time, and only knows which MSs may report. Thus, the BS has to choose between allocating dedicated channels requiring bandwidth resources (slots) for all mobile stations, thus wasting bandwidth, or incurring additional overhead by making frequent use of Mmsgs.

SUMMARY OF THE INVENTION

There is therefore a need to decrease the bandwidth required in a wireless communication system for allowing mobile stations to report aperiodically but frequently to a base station.

According to a first aspect of the present invention, there is provided a wireless communication system comprising a base station and a plurality of fixed or mobile subscriber stations, the base station maintaining connections with each of the subscriber stations by performing wireless communication in units of frames and within each frame, allocating resources for data transmissions and signalling in the wireless communication system, wherein: each frame includes a shared channel provided for the subscriber stations to report a connection quality to the base station, the resources allocated to the shared channel being less than the total resources needed for every subscriber station to report.

According to a second aspect of the present invention, there is provided a base station for use in a wireless communication system to provide connections to a plurality of subscriber stations and communicating with the subscriber stations in units of frames for data transmission and signalling, the base station comprising resource allocation means for allocating available resources in the system to fulfil data transmission requirements of the subscriber stations and signalling requirements, wherein the resource allocation means is arranged to allocate resources to a shared channel for use by the subscriber stations to send reports to the base station, the shared channel providing a number of reporting opportunities in each frame which is less than the number of subscriber stations.

According to a third aspect of the present invention, there is provided a subscriber station, for use in a wireless communication system in which a base station communicates with a plurality of subscriber stations and provides a shared channel for use by the subscriber stations to send reports to the base station, the subscriber station being configured to receive a threshold from the base station, the threshold representing a minimum acceptable level of communication quality, monitor a communication quality with the base station and generate a report when the communication quality crosses the threshold, and transmit the report to the base station on the shared channel.

According to a fourth aspect of the present invention, there is provided a frame format used in a wireless communication system comprising: a downlink subframe for containing downlink data and signalling information to be transmitted from a base station, to subscriber stations of the wireless communication system having a connection to the base station; and an uplink subframe for containing uplink data and signalling information to be transmitted from the subscriber stations to the base station; wherein the uplink subframe includes a shared channel provided for the subscriber stations to report a connection quality to the base station, the resources allocated to the shared channel being less than the total resources needed for every subscriber station to report to the base station.

According to a fifth aspect of the present invention, there is provided a wireless communication method used in a system comprising a base station and a plurality of fixed or mobile subscriber stations, the base station maintaining connections with each of the subscriber stations by performing wireless communication in units of frames, and within each frame, allocating resources for data transmissions and signalling in the wireless communication system, wherein the method comprises: providing, in each frame, a shared channel for the subscriber stations to report a connection quality to the base station, the resources allocated to the shared channel being less than the total resources needed for every subscriber station to report.

The above method of the invention may be carried out by software running on a processor of a base station and/or mobile stations of a wireless communication system.

BRIEF DESCRIPTION OF THE DRAWINGS

Reference is made, by way of example only, to the accompanying drawings in which.

DETAILED DESCRIPTION

A preferred embodiment of the present invention will now be explained with reference to FIGS. 4 to 9.

As already outlined in the introduction, the present invention relates to a wireless communication system in which base stations communicate with subscriber stations by exchange of data packets contained within frames. The frames, which occupy a certain time duration as well as frequency range, each include a downlink (DL) subframe from a base station to subscriber stations, and an uplink (UL) subframe used by the subscribers to send data to the base station. Each (DL & UL) subframe includes a plurality of bursts, and each MS maintains a connection (or "service flow") with the BS by transmitting and receiving packets within one or more bursts assigned to it. Bandwidth within the UL subframe is also used in other words, notably for signalling purposes, and the present invention provides a novel signalling method for mobile stations to report the quality of their connections.

To decrease the overhead in the BS and improve the spectral efficiency of the wireless communication system, the present invention provides a shared channel for mobile stations to report channel quality to the BS. The total amount of allocated bandwidth/resource for the shared channel is less than the total bandwidth/resource required for all mobile stations within the cell to report simultaneously, as follows:

$$R_{total} < N * R_e \quad (1)$$

where $R_{total}$ is the bandwidth allocated to the new shared channel, N is the number of mobile stations within the cell served by the BS, and $R_e$ is the resource required for one MS to report.

The shared channel is a dedicated channel in the sense that resources in the UL subframe are always dedicated to it, regardless of whether they are actually used. However, it differs from the known FFB dedicated channel or CQICH reporting channel mentioned above in that more than one user can transmit on the channel at any one time. This multiple access feature makes the shared channel more like a ranging channel (used when introducing a mobile stations to the network) than a standard reporting channel.

Figure 4:
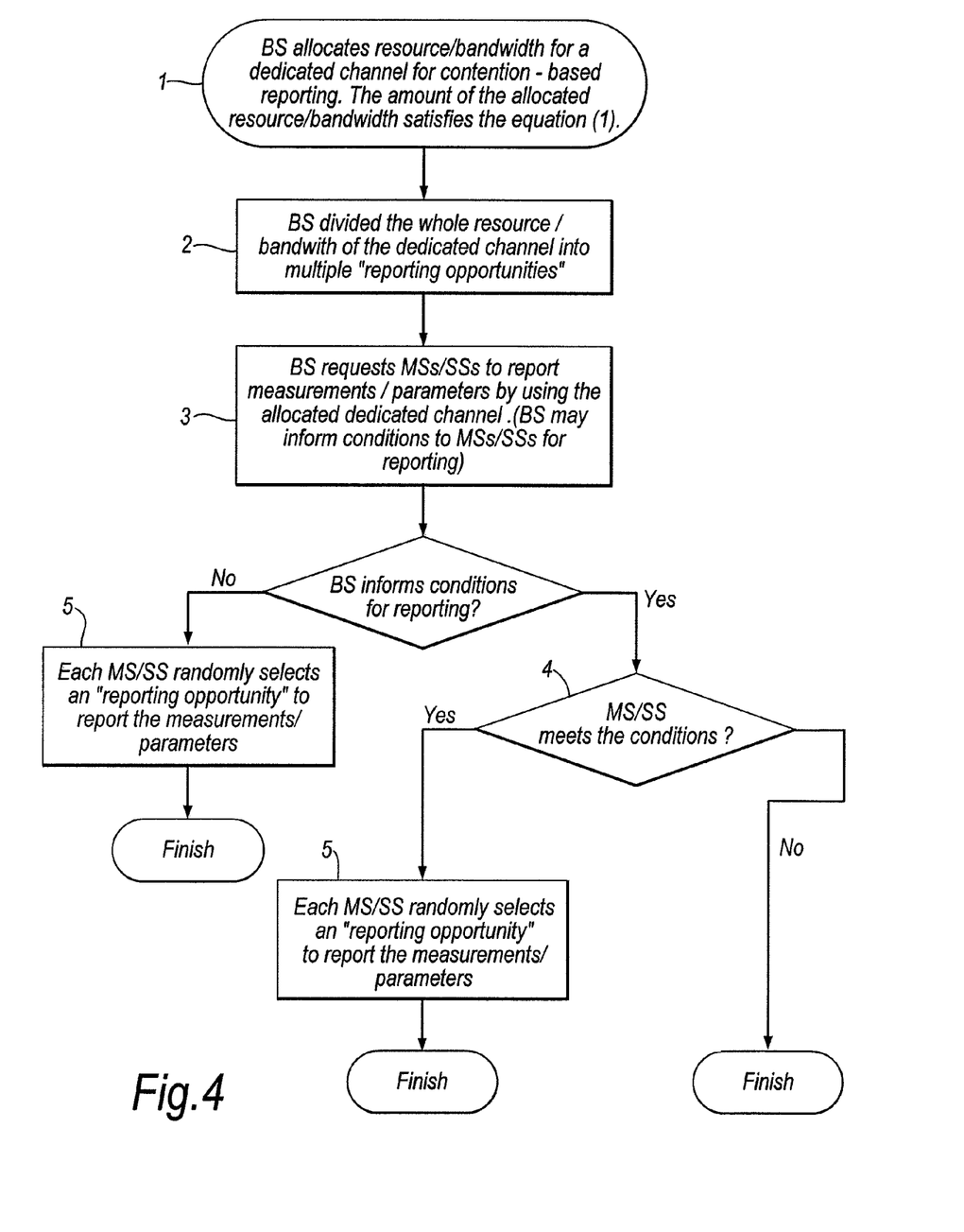
FIG. 4 is a flowchart of a contention-based reporting scheme proposed in the present invention.

In the present invention, the shared channel provides a limited number of possible reports (henceforth called reporting opportunities) within each frame (more specifically, within the UL subframe). In other words, the mobile stations contend to some extend for reporting opportunities in the shared channel, although one reporting opportunity need not be exclusive to one MS as explained below. FIG. 4 shows how this reporting scheme is managed.

Step 1: the BS allocates bandwidth for the new shared channel for contention-based reporting. The amount of resource provided satisfies equation (1) above.

Figure 5:
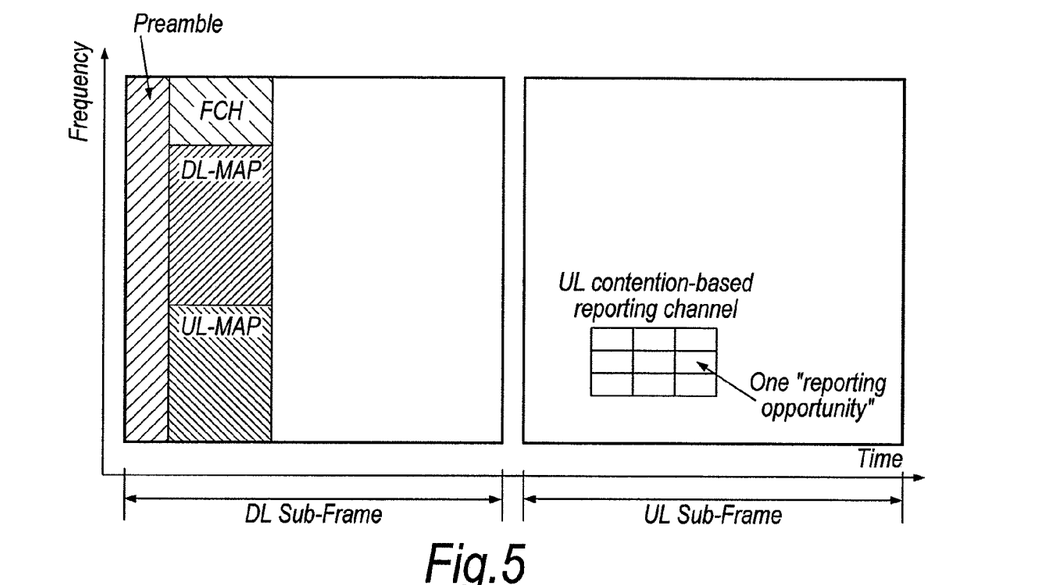
FIGS. 5 to 8 are schematic illustrations of a frame format showing various allocations of reporting opportunities within a UL subframe of a TDD mode system.

Step 2: the BS divides the whole resource of the shared channel into multiple reporting opportunities. One reporting opportunity can be a time slot, frequency band, or 2D (frequency dimension and time dimension) allocation. FIG. 5 shows an example of reporting opportunities provided as a 2D allocation in an IEEE 802.16e UL subframe.

Step 3: the BS requests the mobile stations to report measurements and/or parameters pertaining to the communication quality currently experienced The BS may also inform the mobile stations of any conditions for reporting. For example, one or more threshold levels may be notified to each MS, such that only a SINR (for example) below the threshold is reported back to the BS. Another example is to report only SINR above the threshold. In this specification, whether a threshold is "met" can mean that the measured quality is either above or below (or equal to) the threshold as desired. The request for reports may be implied in the communication of the threshold condition.

It should be noted that there are various possible kinds of threshold. Any measure of quality on the channel can be used. e.g. SNR, SIR, SINR measured on the preamble data, pilots using for example a physical or effective SINR measurement, or some other criterion such as Qos (Quality of Service) of the connection, or buffer status in the MS. The term "channel quality" in the claims is thus to be construed broadly.

Step 4: If the BS has informed conditions on reporting to the mobile stations, each MS checks the conditions for reporting sent by the BS. If the MS meets the conditions, the flow proceeds to step 5. If the MS does not meet the conditions, the process ends, at least for that frame. If the BS has not notified the mobile stations of any condition for response, flow proceeds directly from step 3 to step 5.

Step 5: Each MS needing to report measurements/parameters to the BS randomly selects a reporting opportunity in which to do so. "Random" selection of a reporting opportunity can be achieved using a pseudo-random generator, based for example on the time elapsed since the mobile station was powered-up. Assuming that not all mobile stations are started at the same time, the selection of reporting opportunities by different mobile stations is effectively random.

The MS then reports the channel quality (and/or any other desired parameters) to the BS. Once the MS is assigned to the shared channel, it constantly monitors the channel quality. A simple yes/no signal (denoting above or below the threshold, for example), or an actual measurement (e.g. SINR) may be reported by the MS to the BS. Preferably, the report will be made by transmitting a special orthogonal code selected from a prescribed set of orthogonal codes. If a measurement is to be reported then the code will be utilised to encode the measurement in a similar fashion to that employed in a CDMA system. Depending on the network configuration, this may be a code randomly selected by the MS itself upon entering the network, or alternatively a unique code assigned by the BS.

In the former case, with random selection of both reporting opportunities and ID codes by different mobile stations, it is possible for a conflict to arise, i.e. for more than one MS to select the same code and reporting opportunity. In the case of a solicited report as in Step 3 of FIG. 4, a conflict resolution process can be provided to deal with this eventuality, in which the BS instructs the MS to restransmit the report at a different point.

The request from the BS to the mobile stations, as shown in step 3 of FIG. 4, is not essential. In other words it is not essential for all reports on the shared channel to be solicited in advance by the BS. However, in the case of an unsolicited report, the BS has no way of knowing that a particular MS is trying to send a report, and so cannot instruct a retransmission. Alternatively, it may not always be viable for the reporting MS to use encoding of the message using the (orthogonal) code transmitting in the reporting opportunity. In such instances, the BS may send back an acknowledgement to the unknown MS, allocating resource on the UL to enable the MS to identify itself in a similar fashion to the initial ranging procedure described earlier. Even without identifying the particular MS concerned, receipt of threshold-crossing reports from any MS may be sufficient for the BS to take action.

In the case where the BS assigns a unique code to each MS, there is no real conflict as the BS can distinguish multiple reports received together. That is, pre-encoding the values of the measurements/parameters to be reported with each MS's ID code enables multiple users to simultaneously make use of the selected reporting opportunity but still be distinguishable by the BS. The only problem that may occur is if too many mobile stations try to use the same reporting opportunity, leading to too high a load on the BS, or if the received signal powers of the multiple transmissions are not well balanced. In this instance, there is again the possibility of reports being lost. These are well-known problems for the case of using CDMA as the medium access technique for a shared resource. Again, a resolution procedure may be followed in the case of solicited reports, or partial receipt of reports may be sufficient for the BS's purposes. In any case, the BS can monitor usage of the reporting opportunities and if necessary, allocate a further reporting opportunity in future frames.

The process shown in FIG. 4 finishes once each MS has reported. However, the BS then uses the reports to take any appropriate action to maintain channel quality. For example, when a group of users all receive the same broadcast or multicast signal, the above threshold-based reporting can be used to monitor if the link quality to any user falls below a certain minimum. If this occurs, the BS can adjust the modulation and coding scheme applied to packets for the users, to ensure that all users in the group receive the signal with a desired packet error rate. In general, the action applied by the BS can be applied to one, some or all users as appropriate.

Typically, the process shown in FIG. 4 is repeated every frame, or every preset number of frames.

FIG. 5 shows a first example of how the shared channel fits into the frame structure. The frame structure shown in FIG. 3 is here modified such that part of the bandwidth which might otherwise be allocated to a user burst is dedicated to the new shared channel. In this example (IEE802.16e, OFDMA) the shared channel extends in two dimensions, i.e. both time (the x-axis in the Figure) and frequency (y-axis). The example shown is of a shared channel "window" containing nine reporting opportunities in a 3×3 configuration (i.e. occupying three subdivisions of time and three of frequency), and located nearer in time to the start of the UL subframe than the end.

Here, the subdivisions in time and frequency are related to "slots" and "sub-carriers" as mentioned above, but it should be noted that each reporting opportunity itself will have an extent both in time and in frequency. For example, one reporting opportunity may, as in the case of the ranging channel, extend over six subchannels and one or two time slots in a typical IEEE 802.16 wireless communication system in which three symbols are assigned to a slot.

Of course, the present invention is not limited to such a configuration of the shared channel. Numerous different arrangements are possible depending on the number of mobile stations to be accommodated and the characteristics of the frame.

Figure 6:
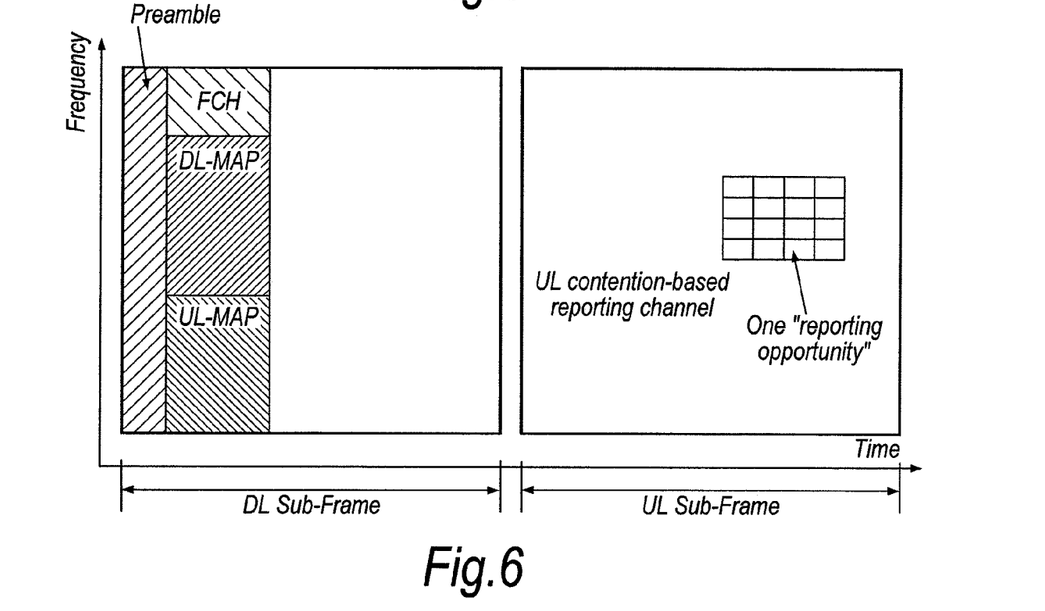

For example, FIG. 6 shows a 4×4 shared channel window located nearer in time to the end of the UL subframe, than to the start of the UL subframe. The positioning of the window in the time dimension is a trade-off between timeliness of the quality information being reported, and the time available to the BS to decode the reports and act on them prior to the next frame. In general, it is envisaged that placing the window near the start of the UL subframe will be preferable in order to report the measurements from the preceding DL subframe as quickly as possible, allowing processing time in the BS for any adjustment of the modulation and coding parameters.

To give a more concrete indication of the size of the shared channel, a typical WiMAX UL subframe might contain up to 35 subchannels×21 symbols for a total of 245 slots. One reporting opportunity, as mentioned above, can occupy six slots, allowing up to 245/6 reporting opportunities in a typical UL subframe (5 ms frame duration for 1024 FFT). In practice, the number of reporting opportunities would normally be quite small, so that the shared channel would normally occupy only a relatively small portion of the bandwidth in the UL subframe.

Figure 7:
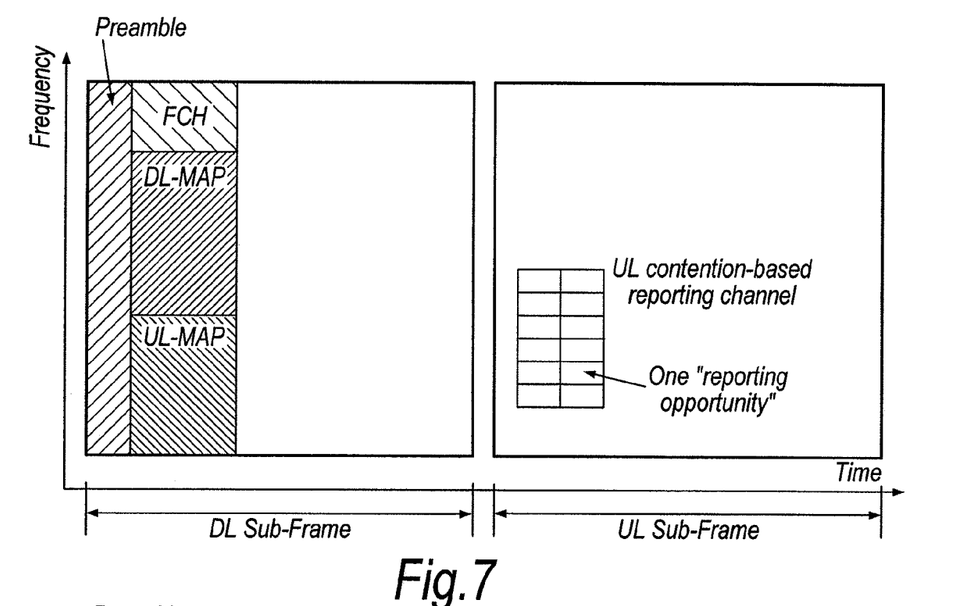

As another example, FIG. 7 shows a 2×6 window located near the start of the UL subframe. This illustrates that one approach is to expand the window, if required, "frequency-first" so that all reporting opportunities occur as close as is practical to the start of the UL subframe. In this way, the BS has more time to decode the reports and take action as necessary (e.g. to change the modulation scheme used for one or more of the mobile stations). On the other hand, there is a tradeoff in that user bursts are likely to be spread over more subchannels, due to the reduction in the number of subchannels for which all symbols are available for data transmission. The impact is that the MS will need a higher power spectral density (because more subcarriers must be used in any one symbol) with consequent effects on the MS's power amplifier, resulting in less effective radiated power per unit frequency, and lower range. In practice, however, processing time at the BS is likely to be the most important consideration.

Figure 8:
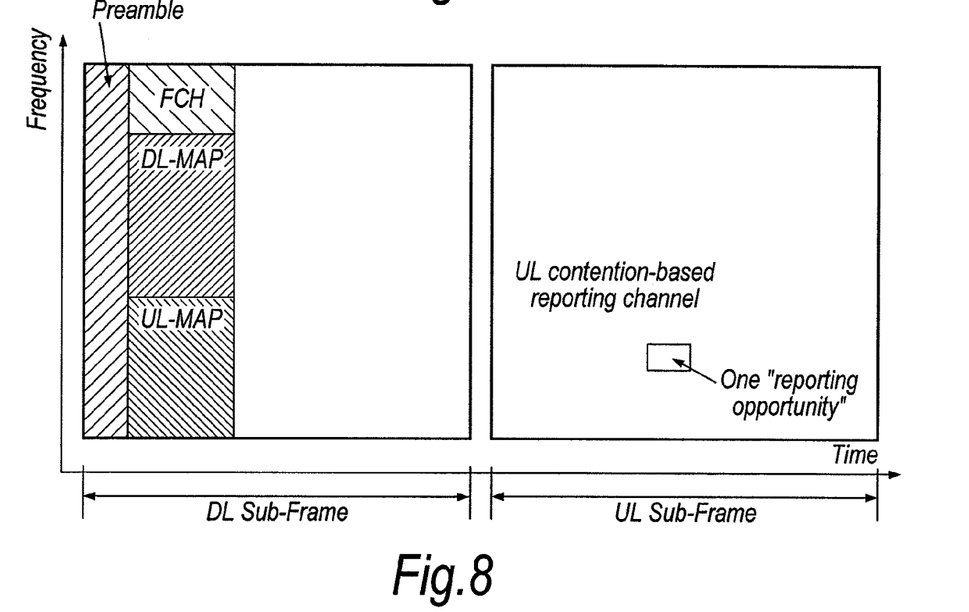

Finally, FIG. 8 shows a minimal shared channel in the form of a single reporting opportunity.

The shape, size and positioning of the window need not be fixed in any practical wireless communication system. In principle, any of these parameters can be varied, frame-by-frame if necessary. To achieve this, the BS defines a region in which the reporting opportunities exist when communicating with each MS. That is, when the BS wants the MS to report based on the shared channel, the BS may allocate a specific code to the MS, and inform the MS of the threshold conditions if any. In addition, the BS indicates which threshold to use (since there may be different thresholds active for different groups of mobile stations) and indicates which region of the UL subframe contains the reporting opportunities which the MS should use when the threshold condition is met.

It is not even essential for the reporting opportunities to be contiguous within the subframe (or in other words for the shared channel to occupy a single area on the time and frequency axes), though it is preferable to avoid scattering them about, owing to the consequential difficulty in identifying them to the mobile stations.

Figure 9:
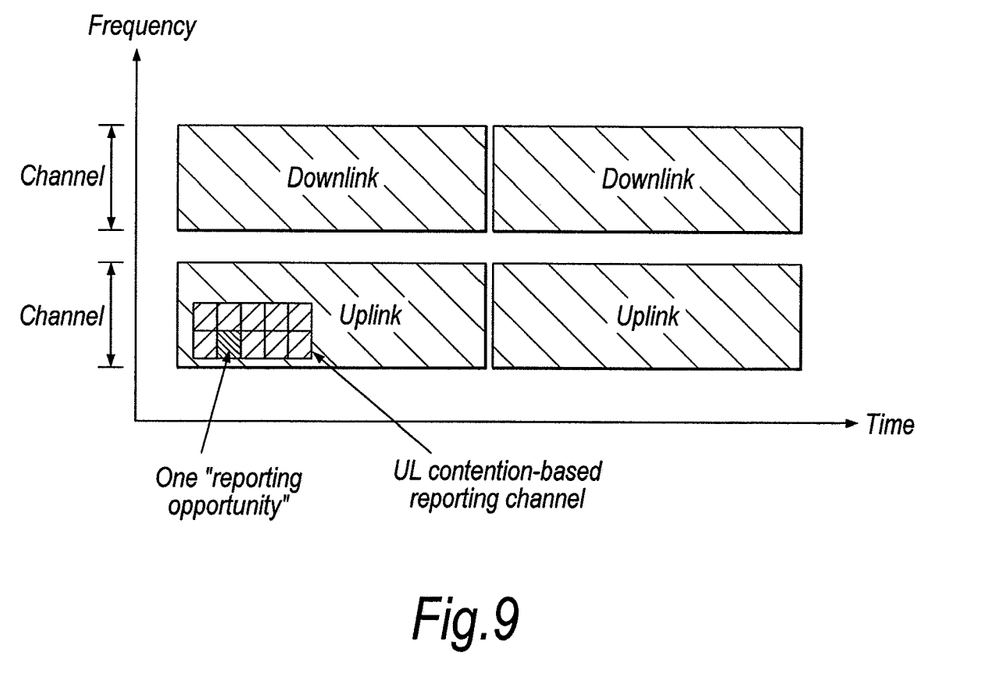
FIG. 9 illustrates a frame format embodying the present invention in the case of a FDD mode system.

The above examples concern a TDD frame structure, but the present invention is also applicable in the case of an FDD configuration. In this case, as shown in FIG. 9, the DL and UL subframe in effect occur in parallel, rather than sequentially. The shared channel, or in other words the window containing the reporting opportunities, is again preferably located near the beginning of the UL subframe, as shown in the Figure, so as to report the results of the measurements of the preceding subframe as early as possible. If the window were located in the middle of the UL subframe, it would be necessary to check which DL subframe was the subject of the measurements being reported, since this would depend on whether the MS was able to complete the measurement and report in time relative to the point in the DL which it is requited to measure.

The above examples apply to an OFDMA configuration, in which user bursts occur simultaneously in time, but over distinct frequency bands. However, the present invention also is applicable in an OFDM system in which the user bursts are sequential. In this case, the shared channel would take the form of a one-dimensional window occupying a "contention slot" of the same kind as used for initial ranging and bandwidth requests. FIG. 3 shows such contention slots at the start of an UL subframe.

To summarise, the present invention provides a wireless communication method used in a system comprising a base station and a plurality of fixed or mobile subscriber stations, the base station maintaining connections with each of the subscriber stations by performing wireless communication in units of frames, and within each frame, allocating resources for data transmissions and signalling in the wireless communication system. The method involves providing, in each frame, a new dedicated shared channel for use by the subscriber stations to report a connection quality to the base station. To save bandwidth in the system, the resources allocated to the shared channel are less than the total resources needed for every subscriber station to report individually within the same frame. The method includes, in the base station, allocating resources to the shared channel, dividing the shared channel into a plurality of reporting opportunities, and transmitting requests for reports to the subscriber stations; and in the subscriber stations, responding to said requests by randomly selecting one of said reporting opportunities and sending a report on the channel quality. Preferably, the responding step is conditional upon the channel quality experienced by each subscriber station meeting a threshold condition set by the base station and included in the requests. Hence, the method allows for multiple mobile stations to report measurements/parameters to a base station in such a way as to decrease the overhead and improve the spectral efficiency of a wireless communication system. The present invention may take the form of a novel BS or MS, or hardware modules for the same, and can be implemented by replacing or modifying software executed by processors of the BS and/or each MS.

Thus, embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of the above-described subsystem. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Although the above description has referred to an IEEE 802.16 wireless communication system by way of example, the invention may be applied to other frame-based communication systems in which reporting on connection quality is needed.

The invention claimed is:

1. A wireless communication system comprising:
   a base station; and
   a plurality of fixed or mobile subscriber stations, the base station maintaining connections with each of the subscriber stations by performing wireless communication in units of frames, wherein each frame includes a downlink subframe for transmissions from the base station to the subscriber stations, and an uplink subframe for transmissions from the subscriber stations the base station and within each frame, the base station allocating resources for data transmissions and signalling in the wireless communication system, wherein
   each frame includes a shared channel included in the uplink subframe and provided for the subscriber stations to report a connection quality to the base station, the resources allocated to the shared channel being less than the total resources needed for every subscriber station to report, and
   each report includes information about the transmission quality in an immediately-preceding downlink subframe with an indication of whether a threshold condition has been met, the base station being arranged to communicate the threshold condition to the subscriber stations within the downlink subframe.

2. The wireless communication system according to claim 1, wherein the base station is arranged to communicate different threshold conditions to different subscriber stations or sets of subscriber stations.

3. The wireless communication system according to claim 1, wherein the information in each said report includes a value representing the transmission quality.

4. The wireless communication system according to claim 1, wherein each report includes a code identifying the subscriber station to the base station.

5. The wireless communication system according to claim 4, wherein the shared channel is divided into a number of reporting opportunities less than the number of subscriber stations, and each reporting opportunity allows at least one subscriber station to report the connection quality to the base station.

6. The wireless communication system according to claim 5, wherein each reporting opportunity allows multiple subscriber stations to report to the base station which distinguishes the reports based on the codes.

7. The wireless communication system according to claim 1 wherein the shared channel is dynamically sized by the base station by altering the amount of resources allocated within the uplink subframe at least in the time dimension thereof.

8. A base station for use in a wireless communication system to provide connections to a plurality of subscriber stations and communicating with the subscriber stations in units of frames for data transmission and signalling, wherein each frame includes a downlink subframe for transmissions from the base station to the subscriber stations, and an uplink subframe for transmissions from the subscriber stations to the base station, the base station comprising:
   resource allocation means for allocating available resources in the system to fulfill data transmission requirements of the subscriber stations and signalling requirements, wherein the resource allocation means is arranged to allocate resources to a shared channel included in the uplink subframe and for use by the subscriber stations to send reports to the base station, the shared channel providing a number of reporting opportunities in each frame which is less than the number of subscriber stations; and
   a transmitter for wirelessly communicating with the plurality of subscriber stations and notifying said subscriber stations of said resources allocated to the shared channel, and arranged to communicate within the downlink subframe a threshold condition for reports from the subscriber stations, each report including information about the transmission quality in an immediately-preceding downlink subframe with an indication of whether the threshold condition has been met.

9. The base station according to claim 8, wherein the base station is further arranged to solicit said reports by sending requests to the subscriber stations.

10. The base station according to claim 9, wherein said reports include reports on connection quality between the base station and the subscriber stations.

11. The base station according to claim 8 wherein the base station is responsive to the reports received from the subscriber stations to adjust modulation and coding parameters used in a succeeding frame.

12. A subscriber station used in the wireless communication system according to claim 1.

13. A wireless communication method used in a system comprising a base station and a plurality of fixed or mobile subscriber stations, the base station maintaining connections with each of the subscriber stations by performing wireless communication in units of frames, wherein each frame includes a downlink subframe for transmissions from the base station to the subscriber stations, and an uplink subframe for transmissions from the subscriber stations to the base station, and within each frame, allocating resources for data transmissions and signalling in the wireless communication system, wherein the method comprises:
  providing, in each frame, a shared channel included in he uplink subframe for the subscriber stations to report a connection quality to the base station, the resources allocated to the shared channel being less than the total resources needed for every subscriber station to report;
  the base station notifying the subscriber stations, within the downlink subframe, of a threshold condition for reporting; and
  the subscriber stations reporting the connection quality, each report including information about the transmission quality in an immediately-preceding downlink subframe with an indication of whether the threshold condition has been met.

14. A non-transitory computer-readable medium having stored thereon software which, when executed by a processor of a base station and subscriber stations in a wireless communication system, carries out the method of claim 13.

* * * * *